United States Patent [19]

Maser

[11] Patent Number: 4,697,456
[45] Date of Patent: Oct. 6, 1987

[54] LEAKAGE TEST FOR LIQUID CONTAINMENT

[76] Inventor: Kenneth R. Maser, 14 Kensington Rd., Arlington, Mass. 02174

[21] Appl. No.: 914,348

[22] Filed: Oct. 2, 1986

[51] Int. Cl.⁴ .................. G01M 3/24; G01N 29/04
[52] U.S. Cl. ............................. 73/592; 73/40.5 A
[58] Field of Search ............ 73/40.5 A, 592, 598, 73/599, 600

[56] References Cited

U.S. PATENT DOCUMENTS

| | | | |
|---|---|---|---|
| 267,825 | 11/1882 | Bell | 73/592 |
| 3,055,209 | 9/1962 | Reid et al. | 73/40.5 A X |
| 3,252,155 | 5/1966 | Surtees et al. | |
| 3,383,863 | 5/1968 | Berry | |
| 3,458,656 | 7/1969 | Sewerin | |
| 4,083,229 | 4/1978 | Anway | 73/40.5 A |
| 4,176,543 | 12/1979 | Nolte et al. | 73/40.5 A |
| 4,404,516 | 9/1983 | Johnson, Jr. | 73/40.5 R X |
| 4,435,974 | 3/1984 | Fuchs et al. | 73/40.5 A |
| 4,457,163 | 7/1984 | Jäckle | 73/40.5 A |

Primary Examiner—Stewart J. Levy
Assistant Examiner—Joseph W. Roskos
Attorney, Agent, or Firm—Lahive & Cockfield

[57] ABSTRACT

A method for detecting leakage from an in-ground liquid containment having a nominally impermeable floor, wherein a source emits a burst and a row of sensors are placed on an opposing side of the containment to receive boundary wave energy transmitted along the containment floor. Traces from the sensors show a regular pattern of boundary wave amplitude or arrival time, with irregularities indicative of regions of floor defects. The sensors each receive energy propagated along a strip radiating from the source. To locate leakage, the method is repeated with source and sensors oriented across a second direction. Irregularities in first and second crossing strips indicate a defect located in the region of intersection of the two strips. Power spectrum analysis of the traces identifies particular types of floor defects, and baseline measurements correct for natural subterranean features.

16 Claims, 11 Drawing Figures $$R_n = \frac{A_{1n}}{A_{2n}}$$

LEAKAGE TEST FOR LIQUID CONTAINMENT

TECHNICAL FIELD

The present invention relates to leakage testing, and more particularly to testing for leakage from a reservoir or an in-ground liquid containment, such as a waste treatment pool, a landfill containing leachates, an industrial waste impoundment, or a settling pond. Such containments are conventionally made by forming an excavation in the earth and lining the bottom thereof with a layer of impermeable clay or a polymer membrane. Concrete pools or metal tank structures are also possible.

Many methods and devices exist for fluid leak detection. Among these, one class of detection methods and devices relies on the fact that a pressurized fluid, leaking past an opening in a containment structure, creates a distinctive sound. This sound may be detected by placing one end of a sound transmissive rod bearing against the containment structure with the other end of the rod contacting a sound-amplifying diaphragm. Such a stethoscope-like device is shown in U.S. Pat. No. 267,825 issued Nov. 21, 1882 for an invention of T. J. Bell. Other devices of this class, for detecting the noise emitted by an active leak, are shown in U.S. Pat. Nos. 3,458,656, 4,176,543, and 4,435,974. The sound may be sensed at multiple locations, or the sound and a reflection sensed at a single location. The sensed sounds may be correlated to determine the distance along the conduit, or the direction within the container, at which a leak occurs. This class of leak detection art is applicable to leaks having a sufficient velocity to emit a characteristic leakage noise.

A second class, more directly applicable to open pools, involves the sensing of an electrical property indicative of leakage. One example, shown in U.S. Pat. No. 3,252,155 issued May 17, 1966 for an invention of L. S. Surtees et al., and particularly applicable to pools of ionic or otherwise relatively conductive fluids, involves construction of a pool with an electrically insulating liner. A first electrode is inserted in the pool and a second electrode is placed in the ground outside the pool. Detection of a conductive path between the inside and the outside of the pool is taken as a sign of leakage of the liner. It is possible, however, in view of the large area of the pool liner, for even an intact liner to have a low resistance. Furthermore, liner properties may be expected to degrade with age, for example with absorption of water, without necessarily allowing leakage through the liner.

Another electrical detection technique involves placing a grid of test wires below the reservoir prior to construction. Leakage through the floor of the reservoir results in corrosion, short-circuiting, or other change in electrical condition of a wire. The change of condition may be measured at the ends of one or more wires to determine the location of a leak. Examples of this class are shown in U.S. Pat. Nos. 3,383,863 of J. R. Berry and 4,404,516 of V. R. Johnson, Jr.

While the foregoing approaches to leak detection are known, none provides a simple and dependable method for detecting leakage from an existing in-ground pool. The sonic techniques tend to be applicable to pressurized fluid conduits or tanks, whereas the electrical techniques require either the prior construction of an in-ground sensing network or the initial use of an electrically insulative liner. Thus it is desirable to have a method for detecting leakage from existing in-ground pools.

SUMMARY OF THE INVENTION

The invention includes a method and apparatus for detecting leakage from a fluid containment into the surrounding ground which does not require the initial construction of a sensing network or special containment structure beyond the existing containment. In accordance with a first aspect of the invention, the method includes the steps of providing an impact or burst source of energy at a first location with respect to the containment, sensing the energy received by a plurality of sensors at a second location across the containment from the source, and identifying deviations in the pattern of sensed energy. The sensors are located sufficiently close to the containment to detect boundary wave energy transmitted from the source along the containment-ground interface, and deviations of sensed waves identify the location and extent of degradations or discontinuities in that interface. The traces of each sensor may be displayed to determine deviations of the sensed boundary wave amplitude, shape or arrival time indicative of leakage.

As viewed throughout this disclosure, the words "trace" or "traces" are used in their broadest sense to mean the signals produced by a sensor, and representative of the energy sensed by the sensor, and also to mean any stored, recorded, or processed representation thereof.

According to a further aspect of the invention, a device for the detection of leakage from a containment into the surrounding ground includes a burst source placed in operation at one side of the containment, a plurality of sensors in contact with the ground placed in a row along a distal side of the containment, and an instrument for displaying the time traces of the sensors so as to develop a representation of a transmission anomaly beneath the containment indicative of leakage. Preferably the sensors are placed so that each sensor receives the boundary wave energy transmitted along a line whose length varies regularly from sensor to sensor. Thus, a transmission anomaly identified by one or more sensors will define a narrow strip in which some disturbance to the liner has occurred. In a further embodiment a second row of sensors is placed transverse to the first row, and a transmission anomaly indicative of leakage which appears in a first strip of the first row and in a second strip of the second row is determined to be localized in the region of intersection of the first and second strips.

The instrument for displaying time traces may further include a filter or other means for representing a power spectrum component of the sensed boundary wave which is particularly correlated to a subsoil leakage condition. The instrument preferably further includes a peak detector for detecting the time of arrival of the boundary wave peak at each sensor, and means for correlating the peaks to detect anomalies in arrival time.

BRIEF DESCRIPTION OF THE DRAWINGS

These and other features of the invention will be understood with reference to the drawings, in which.

DETAILED DESCRIPTION

Figure 1:
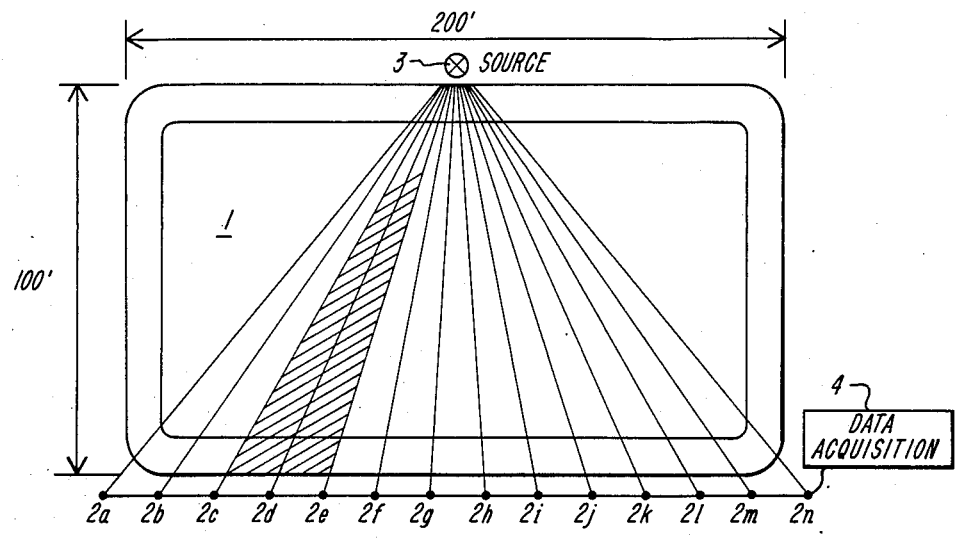
FIG. 1 shows a schematic representation of a basic application of the invention to an in-ground containment.

FIG. 1 shows an illustrative basic embodiment of the method and apparatus according to the present invention for determining leakage from an in-ground liquid pool. The Figure shows a plan view of a liquid waste impoundment 1 of which the clay liner, membrane, or other containment-bounding surface is to be evaluated for leakage. Thousands of such impoundments are located throughout the United States, and the possible leakage of their contents into ground water supplies is a matter of vital concern. Typical dimensions of an impoundment may be, for example, one hundred feet by two hundred feet.

As shown in FIG. 1, a series of geophones $2a$, $2b$, $2c$ ... $2n$ are placed in a row along one side of the impoundment. The geophones may be of a standard seismic type, such as those sold by AMF Geospace of Houston, Tex. under the trademark GEO-SPACE as model GS-100, and having natural frequencies in the range of 10 to 200 Hz. The geophones are placed to measure the vertical component of motion, which is predominant component of boundary wave motion. On the opposing side of the pool a burst source 3 is placed opposite to the geophones. The exact distance of each geophone from the source, and the geophone spacings, are determined using, for example, standard electronic surveying equipment, e.g., "TOTAL STATIONS" such as the Nikon OTM-1 sold by Nikon, Inc. of Garden City, N.J. The distance measurements are used, as discussed below, to determine the propagation velocity of the sensed waves, so as to plot the expected seismic patterns, and thus permit quantification of any deviations in observed seismic patterns noted at particular sensors. The burst source may be any of a variety of standard seismic sources, such as an air gun, a dropped weight, a sparker, or a small explosive charge. Thus, the term "burst source", as used in the description and the appended claims, means any means for applying a high amplitude, short duration pulse of mechanical energy. The sensors are connected to a data acquisition unit 4, which may be triggered by the sensor closest to the source, or by a separate sensor.

The containment test apparatus operates as follows. The burst source is actuated, creating boundary waves which propagate across the liner of the containment. The boundary waves propagate at a slower rate than the pressure or "body" waves traveling directly through the ground, and will generally also have a far greater magnitude than the body waves. The boundary waves, after propagating across the liner, are picked up at the geophones. Data acquisition unit 4 records a series of time traces, one for each geophone. Unit 4 may be standard seismic data acquisition equipment, such as, for example, the trace recorder sold under the trademark WesComp 11 made by the Weston Geophysical Corporation of Westboro, Mass. The traces for each geophone of the boundary wave arrival time and pattern may be displayed, or, as discussed in the illustrative example below, may be analyzed without display.

Figure 3:
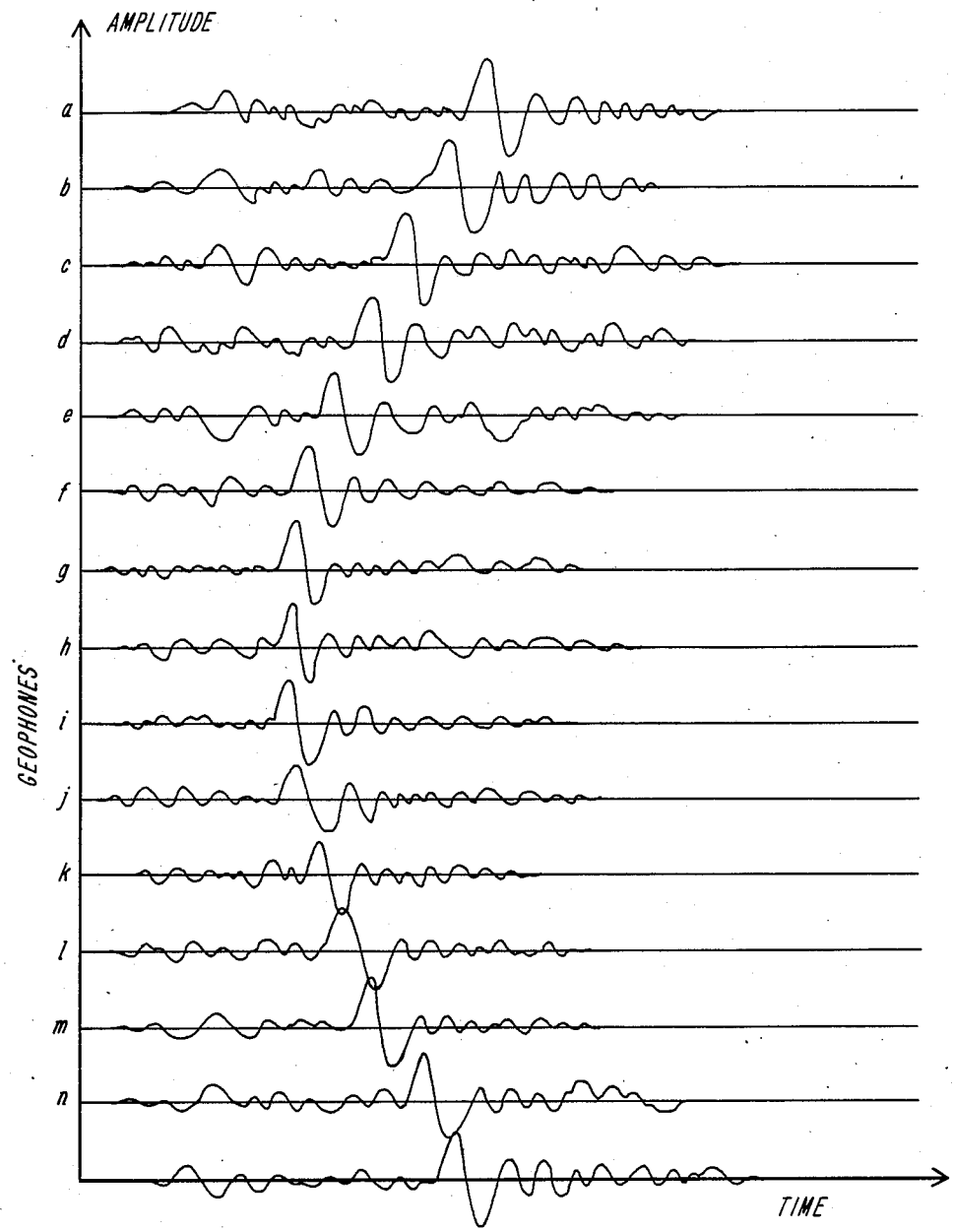
FIG. 3 shows an exemplary pattern of time traces of the sensor array shown in FIG. 1.

FIG. 3 shows a typical display of such traces for the configuration shown in FIG. 1. Each line is the trace from one geophone, and represents the amplitude of ground motion versus time sensed by that geophone. The main event in each trace represents the arrival of the boundary wave. The regular variation of arrival times from geophone to geophone as shown in FIG. 3 reflects the variation in distance traveled by the wave from the source to each geophone, under conditions in which the liner and subsoil are substantially homogeneous.

Figure 2A:
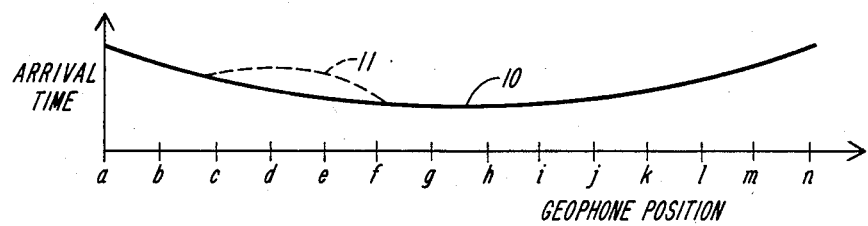
FIGS. 2A, 2B show a schematic representation of the boundary wave detection time and amplitude respectively for the sensor array shown in FIG. 1.
Figure 2B:
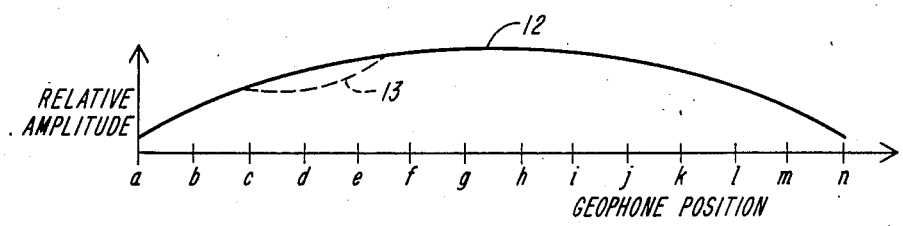

FIGS. 2A, 2B are graphs of the arrival time and the relative amplitude, respectively, of the sensed boundary wave with geophone position.

As shown in FIG. 2A, with the geophone layout disclosed in FIG. 1, the sensed time of arrival 10 of the boundary wave at each geophone will generally differ by a small and regular interval from the arrival time at an adjacent geophone. The time increment depends on the distance the wave propagates through the liner to the sensor. The detectable boundary waves of interest will typically have a wavelength on the order of 10-20 feet, and the placement of the phones within several feet of the boundary of the containment permits a fairly accurate determination both of the time of arrival and the amplitude of the boundary wave itself. A zone of saturation and high permeability between a sensor and the source results in a localized delay, shown at 11, of the arrival of the boundary wave energy at that sensor.

FIG. 2B plots the relative amplitude 12 of the wave, which will be greater for shorter distances of propagation along the floor and which also varies, from geophone to geophone, according to the geophone spacing from the source. A zone of liner leakage between the source and a sensor generally results in a diminished amplitude, shown at 13, of the boundary wave signal at that sensor.

In each case, the solid line indicates the expected amplitude or time measurement when there are no subsurface inhomogeneities.

The amplitude shown in FIG. 2B may be taken as a direct peak amplitude measurement from the time trace, as shown in FIG. 3, or may be derived from a frequency analysis of each trace. A frequency analysis of a trace may be carried out by digitizing the time trace, and using readily available Fast Fourier Transform (FFT) software to analyze the digitized time trace so as to derive, for a given geophone, the total area under the trace between selected upper and lower frequency limits. By selecting a power spectrum component characteristic of the boundary wave, a more precise signal definition is obtained, permitting the more certain recognition of containment-floor-induced energy propagation anomalies.

Figure 4A:
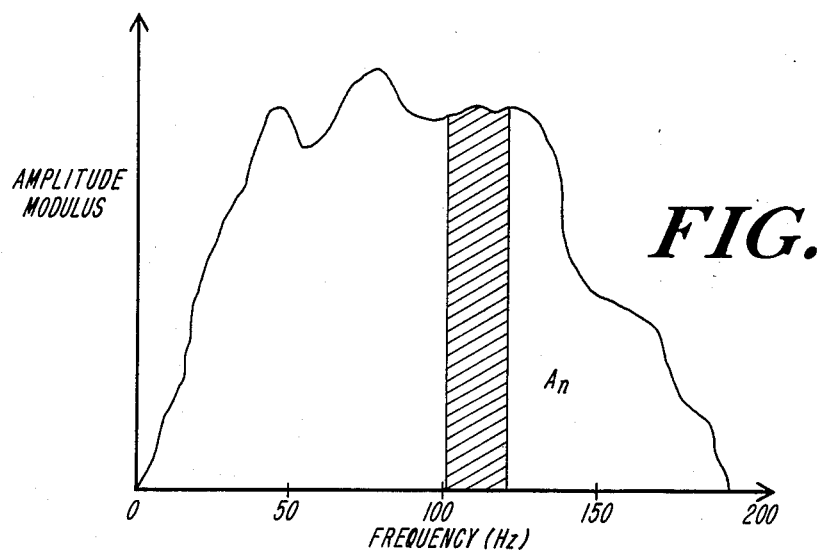
FIGS. 4A, 4B show representative boundary wave amplitude measures of the sensors.
Figure 4B:
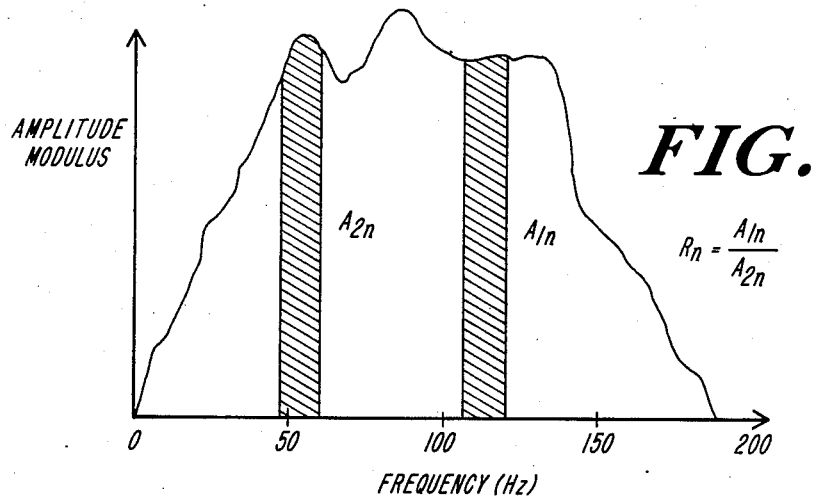

FIG. 4A shows a representative energy analysis of an arriving seismic wave in a frequency range characteristic of boundary waves. The total area under the curve A between two frequency limits gives a measure $A_n$ representing the energy in the wave band characteristic of boundary waves. Another measure of the amplitude which might be employed, for example, is the ratio of the areas between two different frequency bands, as shown in FIG. 4B. One frequency band is selected to have frequencies characteristic of leak-sensitive boundary waves; the other to have frequencies characteristic of non-leak sensitive wave components, e.g., refracted pressure waves. The ratio $R_n$ of the boundary wave energy (right hand band) to the pressure wave energy (left hand band) provides a well defined measurement correlated with the wave. The pressure wave energy is unaffected by conditions at the liner, and serves as a normalizing background, or noise, correcting factor. Either of the two measures, $A_n$ or $R_n$, can be used as a measure of amplitude and plotted against geophone position. By suitable choice of the measure, or by choosing the appropriate frequency band, a measure which yields optimum definition for a given soil condition or containment floor construction is realized.

In the absence of leakage, the amplitude varies regularly and predictably with geophone distance from the source and with path length along the containment floor, as shown in FIG. 2.

It has been found that a variation in the expected regular pattern of the amplitude or arrival time is indicative of an arriving boundary wave which has passed through an inhomogeneity in the liner or contiguous subsoil. When the variation combines an increase in the arrival time with a decrease in relative amplitude, such as shown by the dashed lines 11, 13 in FIGS. 2A, 2B, the variation is likely to be caused by a zone of fluid saturation and high permeability. As such it is indicative of containment leakage.

The nature and magnitude of the variation will be indicative of the type of defect, and will distinguish defects from natural homogeneities. For example, a leaking liner located in naturally saturated subsoil will display a decrease in amplitude even if no increase in arrival time is indicated. As another example, measurements made over a period of time (e.g., months) will permit the distinction between natural (unchanging) inhomogeneities in the liner and subsoil, and leakage-induce (changing) inhomogeneities. Such measurements also reveal certain natural periodic subsoil events, such as an annual elevation of the water table near to the containment floor. A method according to the present invention includes, in one aspect, performing baseline measurements of boundary waves, and comparing later-performed measurements to detect containment boundary changes.

With the sensing apparatus of the invention, shown in FIG. 1 above, each sensor receives energy along a segment emanating from the source. An irregularity measured at a sensor identifies a segment in which liner deterioration or leakage has occurred.

In order to more accurately identify the location of a suspect area, as must be done to plan or undertake remedial work, a second series of measurements according to the invention is made along an axis transverse to the first row of sensors.

Figure 5:
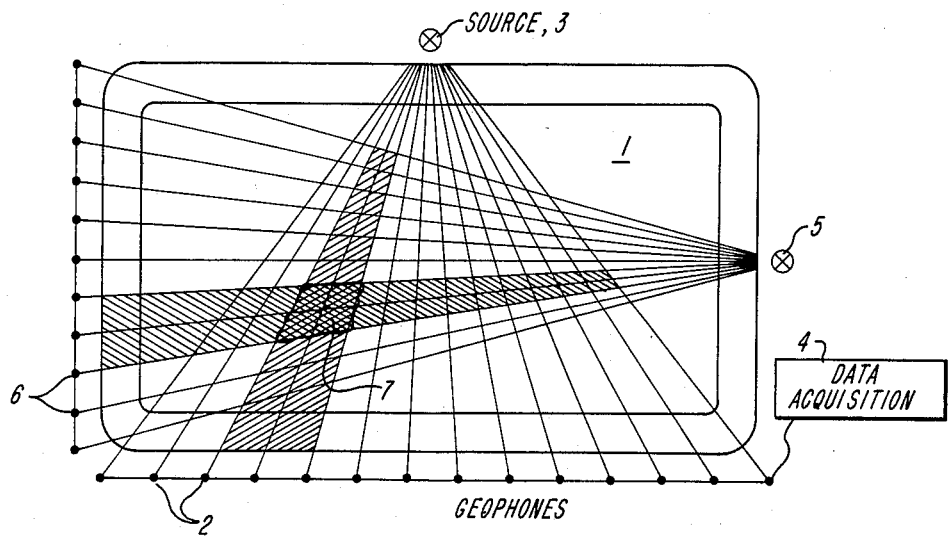
FIG. 5 is a schematic representation of a preferred embodiment of the invention.

Such a configuration is shown in FIG. 5. In this preferred embodiment of the invention, a second burst source 5 is actuated opposite a second array of sensors 6, so that the lines from the source to the sensors intersect those of the first array and define a grid. By recording the time traces of the sensed boundary waves received by the second array, and determining deviations from a predicted pattern, a liner anomaly can be localized in two dimensions to be at the intersection of one or more segments of the first array with one or more segments of the second array.

It will be observed that with the geometry shown in FIG. 5, the corners of the containment nearest each source do not lie in the propagation path to two different sensors, or possibly even to one sensor. Accordingly, in a further embodiment of the method of the invention, a source may be placed close to a corner of the containment and an array of sensors aligned along the one or more sides of the containment diagonally opposite to the source to develop a boundary wave transmission signal for a set of bands covering the corner region of the containment. Other source-sensor configurations may be used to survey irregularly shaped portions of other pools or containments.

A more detailed discussion of the method of detecting containment leakage and apparatus according to the invention is set forth below with reference to FIGS. 6 through 9.

Figure 6:
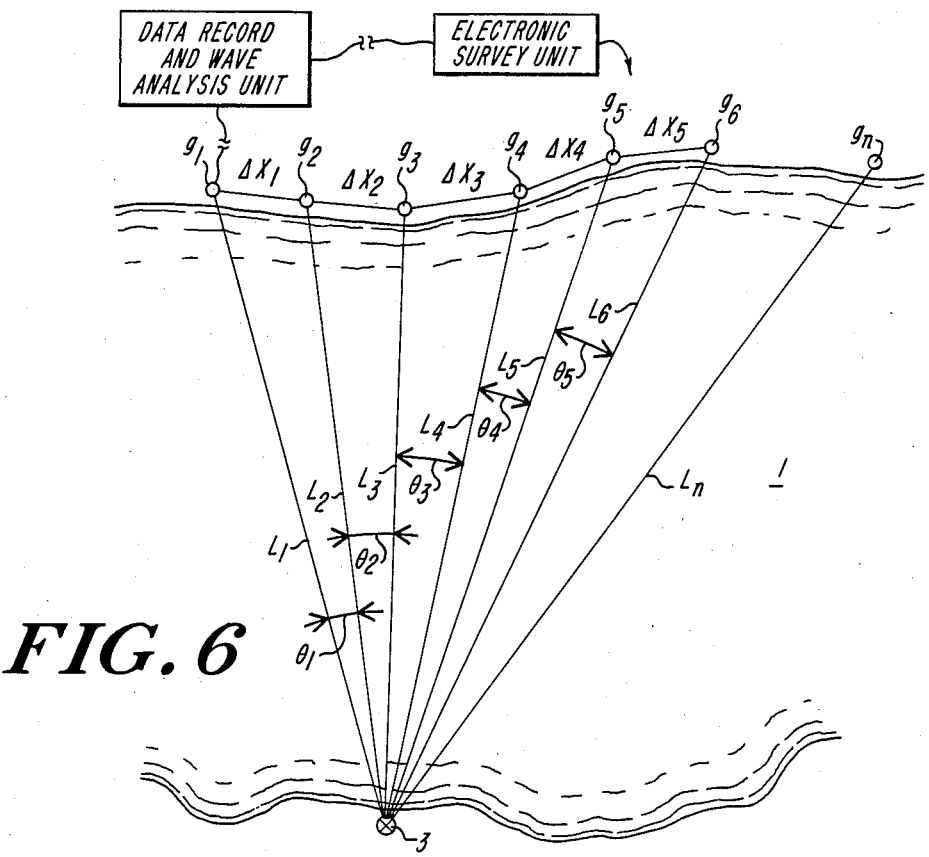
FIG. 6 is a detailed schematic representation of an illustrative sensor array.

FIG. 6 shows a seismic source 3 placed on one side of a pond or containment 1 and an opposed array of geophones ($g_1, g_2, \ldots g_n$) spaced along the ground adjacent to the containment. $L_i$ represents the distance from the source 3 to geophone $g_i$. $\theta_i$ represents the angle between the line connecting the source and geophone $g_i$, and the line connecting the source and geophone $g_{i+1}$. The distance between $g_i$ and $g_{i+1}$ is denoted $\Delta x_i$. N is the total number of geophones. As discussed above, the distances $L_i$ may be determined using electrical surveying equipment to a very high degree of accuracy. Similarly, the angles $\theta_i$ may be determined using conventional surveying equipment. The time of arrival of each boundary wave at a corresponding sensor $g_i$ will be equal to the distance $L_i$ divided by the velocity V of propagation of the boundary wave.

Figure 7:
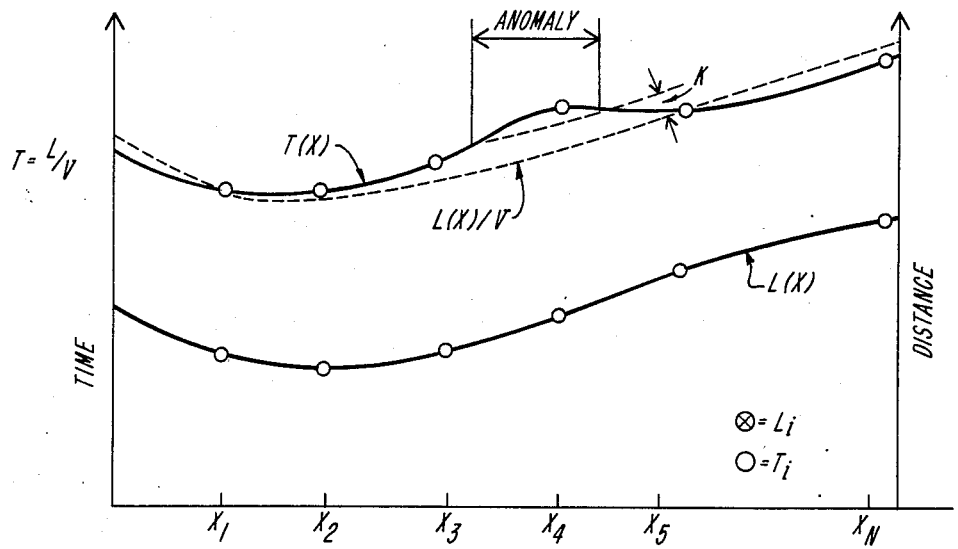
FIG. 7 is a graph of sensor distances and wave arrival times for the array of FIG. 6.

FIG. 7 shows graphs of the distance L and the expected time of arrival T for points x along the string of geophones. Each $x_i$ is defined as $$x_i = \sum_{j=1}^{i-1} \Delta x_j$$

That is, $x_i$ is the approximate curved distance along the geophone array to geophone $g_i$. The dotted curve indicates the expected time of arrival and is equal to $L(x)/V$, where V is derived using a curve-fitting procedure assuming that the velocity of propagation is substantially constant. The upper, solid, curve represents an actual measured time of arrival of the boundary wave as recorded at the geophones $g_i$. The vertical offset, K, is a threshold deviation taken as indicative of a transmission anomaly.

In the preferred practice of the invention, the geophone array is set up, the distances $L_i$, $\Delta x_i$, and the angles $\theta_i$ are determined, and the burst source is actuated and the sensed boundary waves recorded. From elementary geometry, $$(\Delta x_i)^2 = (L_i)^2 + (L_{i+1})^2 - 2L_i L_{i+1} \cos \theta_i.$$

Preferably, the set of discrete points $x_i$ is converted into a continuous function using regression analysis or other standard curve fitting procedure. The actual boundary wave arrival times, curve T(x), are determined using a peak detection algorithm for sampling the boundary wave signals recorded by each sensor $g_i$.

Next, the boundary wave velocity V is determined using a curve fitting procedure to produce the best match between the expected arrival times and the detected arrival times. There are a number algorithms which may define "best match", each of which may serve this purpose. An algorithm which accentuates local deviations from the curve is favored over one which smooths over local anomalies. Once the velocity V is calculated, the actual arrival times at each point x are compared to the anticipated arrival times, $L(x)/V$ and where the mismatch $L(x)/V - T(x)$ exceeds a prescribed threshold, K, for points x along a segment of arc, an anomaly is determined to exist in the strip radiating from the source to the segment. The threshold K is selected based on the expected sensitivity of the sensors.

Figure 8:
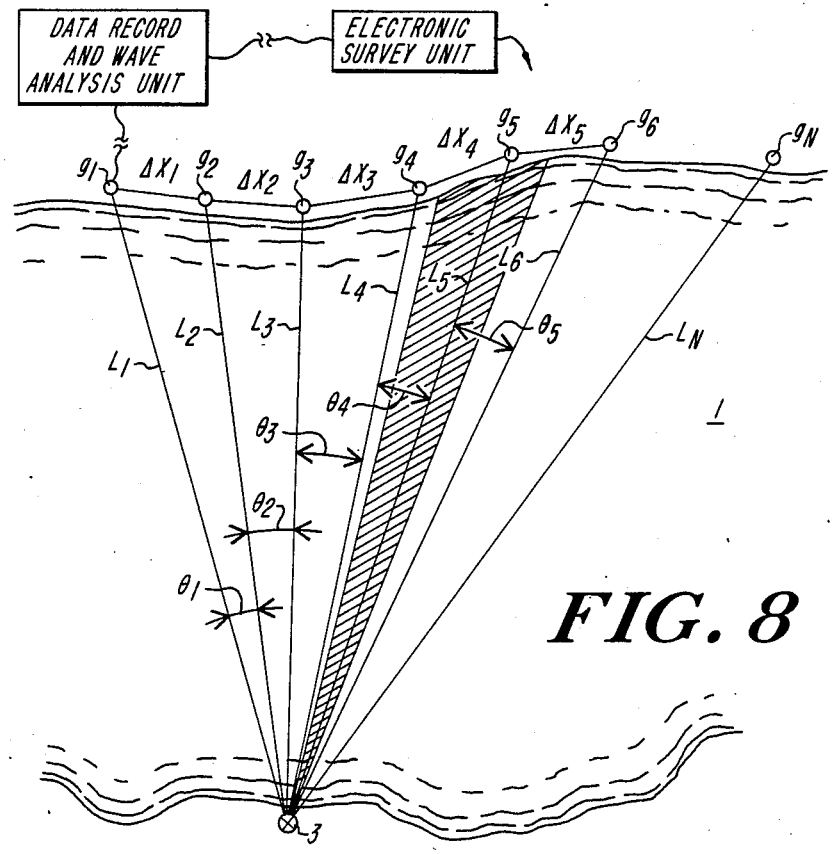
FIG. 8 shows the array of FIG. 6 with an illustrative leakage site corresponding to the data of FIG. 7.

In the example shown in FIG. 7, an anomaly is determined to exist in a segment located between $x_3$ and $x_5$. This corresponds to a wedge-shaped strip containing geophone sensor $g_5$. FIG. 8 illustrates the anomaly strip corresponding to the anomaly noted in the time deviation of FIG. 7.

The analysis described above may be implemented as a computer program and the geophone traces or recordings thereof may be directly provided to a computer, which then samples the raw data, performs the curve fitting procedure to determine the velocity V, and determines the variation of each trace from its expected measurements along the strip of sensors, so as to define anomalous areas indicative of leakage. The electronic survey data may be provided as a direct input signal to the computer for defining the distances $L_i$ and the angles $\theta_i$ used in the computation.

FIG. 8 illustrates the strip about sensor $g_5$ corresponding to the anomaly strip of FIG. 7. Since the strip radiates from the source 3, the resolution of the one-dimensional determination of an area of leakage will be finer for leaks located near to the source. As discussed in relation to FIG. 5, a second set of strip-measurements is performed to localize the leak in two dimensions. This may be done using first and second sources, and corresponding first and second geophone arrays, with the two sources actuated at different times. Different mutually opposed or mutually oblique locations of the two arrays may be selected to optimally determine the location of a leak. In fact, by simply moving the burst source, a second series of strip segments, crossing the first series, may be made without re-locating the geophones. Such a second series permits increased accuracy in locating leaks near to the sensors, but would be "blind" to conditions proximal to the first source.

Figure 9:
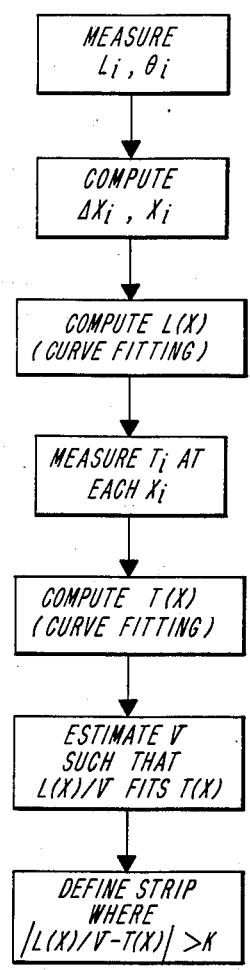
FIG. 9 is a flow chart of the method of containment testing.

FIG. 9 is a flow chart of the steps of the preferred method, and the operation of the apparatus according to the invention for determining anomaly strips of leakage in a liquid containment. Each step of the flow chart corresponds to a computational module of a preferred apparatus, which, as noted above, is implemented in software to derive the distances, velocities and expected and measured energy waveforms. The modules may be seen as separate functional units of a signal processing apparatus, and accordingly, a separate block diagram of that portion of the apparatus is not shown.

The procedure described above, and the graph of FIG. 7 in particular, relate to deviations in the arrival time T(x) of the boundary wave at one or more of the geophones in the array. A corresponding procedure is applied to amplitude anomalies indicative of leakage. Instead of the quantity T(x), the quantities $A_n(x)$ or $R_n(x)$ (FIG. 4) are determined. An expected amplitude, e.g., A(x) is predicted from the measured geometry as $$A(x)/A_1 = L_1/L(x) e^{-\alpha(L(x)-L_1)}$$

Thus, knowledge of the interpolated measured distance function L(x) determines an expected amplitude defined along the path on which the array of geophones is placed. The attenuation, $\alpha$, is selected as that which produces the best match between expected and measured amplitudes. A second prescribed (amplitude) threshold constant $K_A$ is selected, and deviation of the measured amplitude from the expected amplitude by more than the second prescribed threshold is indicative of liner degradation.

It will be appreciated that the characteristics of the boundary wave are dependent upon the stiffness in compression of the containment-ground interface layer as well as the difference of mechanical properties of the containment from the surrounding ground material. Accordingly, one or both of the timing and the attenuation characteristics may be used as an indicator of leakage depending on the characteristics of the surrounding materials.

Accordingly, in a further aspect of the invention, a method of leakage testing includes performing the leakage test as described above at earlier and at successive later times to determine baseline measurements. When tested according to this further preferred method, the presence of erratic subsurface features, such as boulders, variable water tables, and subterranean streams, may be detected and may be distinguished from boundary wave effects which might otherwise be construed as indicative of leakage. In this manner, the invention provides a non-destructive surveying method for an in-ground liquid containment.

Based on preliminary experiments, it is expected that full scale measurements will utilize frequencies in the range from approximately 20 to approximately 200 Hz. These frequencies correspond to wave lengths of between approximately 5 and approximately 50 feet. The shorter wave lengths will yield most information regarding liner conditions, but are generally most useful in facilities with smaller dimensions, as they are subject to greater attenuation. The longer wave lengths provide less detail, but propagate better over long distances.

It has been found that the ratio of depth of altered liner properties to wave length required to discern a variation in received boundary wave characteristics is approximately 0.07. Thus, the wavelength range of 5 to 50 feet will resolve liner and subsoil anomalies having a minimal thickness between approximately 4 to 42 inches. Such a level of detection enables early diagnosis of a leakage problem, and permits remedial action before significant escape of contaminants.

It will be appreciated that although the invention has been described in terms of an array of geophones placed along the containment, hydrophones can be employed on the surface of, or within the containment to similar advantage. However, because of the nature of fluids within such containments, it may be undesirable to contaminate the sensors with the containment materials. Similarly, while the invention has been described with regard to an in-ground containment, what is important is that the containment have a boundary in contact with the ground for defining a ground/containment interface for the propagation of boundary waves. Thus, a tank or reservoir resting on the ground can be inspected by the method and apparatus of the invention.

Thus, while the invention has been described with reference to particular embodiments thereof, such description is by way of illustration only and not limitation. Other variations will occur to those skilled in the art and all such variations are intended to be within the scope of the invention as defined by the following claims.

What is claimed is:

1. Apparatus for detecting leakage from an in-ground containment having a nominally impermeable floor, wherein the apparatus comprises
    a burst source, placed in operation at one side of the containment
    sensor means, including a first plurality of mechanical motion sensors in contact with the ground and in operation spaced in a row along a side of the containment away from the source, for each receiving and sensing energy transmitted from the source substantially along a first respective strip underlying the containment, and
    recording means for simultaneously recording traces of the sensor means whereby there is developed a representation of a transmission anomaly beneath the containment indicative of leakage.

2. Apparatus according to claim 1, wherein the sensor means also includes a second plurality of sensors spaced in a second row along a further side of the containment for each receiving and sensing energy transmitted from the source along a second respective strip underlying the containment, said second respective strips being oriented generally transverse to said first strips, and wherein said recording means further records traces of said second row of sensors, whereby an anomaly indicative of leakage in a first respective strip and in a second respective strip is detected to be in the region of the intersection of the said first and said second strips.

3. Apparatus according to claim 1, further including
    means for determining the location of each said sensor with respect to the burst source, and
    means for determining expected traces of a sensor as a function of the location of that sensor with respect to the burst source.

4. Apparatus according to claim 1, further including means for determining a selected power spectrum component of the sensed burst.

5. Apparatus according to claim 4, wherein the component is characteristic of a boundary wave transmitted along the floor of the containment.

6. Apparatus according to claim 1, further including a second burst source, spaced from the first source, and means for processing energy transmitted from said burst source and said second burst source to said sensors so as to determine a region of leakage of said containment floor.

7. A method for detecting leakage from an in-ground liquid containment such as a waste treatment containment, such containment having a nominally impermeable floor, wherein the method comprises the steps of
    placing a burst source in operation on one side of the containment
    placing a plurality of acoustic sensors spaced along the ground adjacent the containment such that each sensor receives energy transmitted from the source along a first respective strip underlying the containment, and
    recording traces representative of energy received by the sensors whereby in the event of leakage there is developed a representation of a transmission anomaly beneath the containment indicative of the leakage.

8. The method of claim 7, further including the steps of placing a plurality of sensors in a second row along a further side of the containment such that each sensor receives energy transmitted from the source along a second respective strip underlying the containment, said second respective strips being oriented transverse to said first strips, and wherein the step of recording includes recording traces of said second row of sensors, whereby a transmission anomaly indicative of leakage in a first respective strip and in a second respective strip is detected to be in the region of the intersection of the said first and second strips.

9. The method of claim 8, further including the steps of
    determining the location of each said sensor with respect to the acoustic burst source
    determining a predicted pattern of said traces, and
    determining a deviation of a recorded trace from the predicted pattern.

10. The method of claim 9, wherein the step of determining a deviation includes determining a selected power spectrum component of the sensed burst.

11. The method of claim 10, wherein the component is selected to be characteristic of a boundary wave transmitted along the floor of the containment.

12. The method of claim 7, further including the steps of
    determining the location of each said sensor with respect to the acoustic burst source
    determining a predicted pattern of said traces, and
    determining a deviation of a recorded trace from the predicted pattern.

13. The method of claim 7, further including the step of determining a selected power spectrum component of the energy received by said sensors.

14. The method of claim 13, wherein the component is selected to be characteristic of a boundary wave transmitted along the floor of the containment.

15. The method of claim 7, further including the step of placing a second burst source in operation at a location distinct from the burst source and recording traces representative of energy received from said second source, so as to determine boundary wave transmission characteristics of first and second sets of strip regions of the containment floor, said first and second sets of strip regions radiating from said burst source and said second burst source, respectively.

16. Apparatus for detecting and locating leakage regions in the floor of a liquid containment, such apparatus comprising
    exciter means for applying a pulse of energy to the containment
    plural sensor means for sensing at plural spaced-apart points boundary wave energy transmitted along the containment boundary from said exciter means and for developing signals representative thereof
    analysis means for analyzing the signals representative of the boundary wave energy at said plural spaced-apart points to determine a regular pattern, and
    means for comparing the signals sensed by the sensors to the regular pattern to determine signals representative of sensed boundary waves propagated through leakage regions of the containment floor.

* * * * *